(12) United States Patent
Imm

(10) Patent No.: US 10,134,104 B2
(45) Date of Patent: Nov. 20, 2018

(54) SYSTEMS AND METHODS FOR PROVIDING REDUCED COMPLEXITY RENDERING OF USER INTERFACE ELEMENTS

(71) Applicant: Facebook, Inc., Menlo Park, CA (US)

(72) Inventor: Andrew Harrison Imm, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 97 days.

(21) Appl. No.: 15/349,883

(22) Filed: Nov. 11, 2016

(65) Prior Publication Data

US 2018/0137597 A1    May 17, 2018

(51) Int. Cl.
*G06T 1/20* (2006.01)
*G06T 9/40* (2006.01)
*G06T 11/00* (2006.01)
*G06F 15/80* (2006.01)

(52) U.S. Cl.
CPC .............. *G06T 1/20* (2013.01); *G06T 9/40* (2013.01); *G06T 11/001* (2013.01); *G06T 2200/24* (2013.01)

(58) Field of Classification Search
None
See application file for complete search history.

(56) References Cited

U.S. PATENT DOCUMENTS

| 2004/0162839 | A1* | 8/2004 | Udeshi ................. G06T 17/005 |
| 2005/0028091 | A1* | 2/2005 | Bordawekar .......... G06Q 10/10 715/200 |
| 2005/0203901 | A1* | 9/2005 | Waldvogel ........ G06F 17/30545 |
| 2010/0281383 | A1* | 11/2010 | Meaney ................. G11B 27/34 715/723 |
| 2013/0106852 | A1* | 5/2013 | Woodhouse ............ G06T 17/20 345/423 |
| 2013/0159893 | A1* | 6/2013 | Lewin ..................... G06F 3/048 715/762 |

* cited by examiner

*Primary Examiner* — Aaron M Richer
*Assistant Examiner* — Khoa Vu
(74) *Attorney, Agent, or Firm* — Sheppard Mullin Richter & Hampton LLP

(57) ABSTRACT

Systems, methods, and non-transitory computer readable media can determine a depth of rendering a user interface (UI) element organized as a tree structure including one or more elements, wherein each element of the one or more elements is associated with a customary rendering logic and an alternative rendering logic. Whether an element in the tree structure is at a boundary for rendering the UI element can be determined based on the depth of rendering the UI element. In response to determining that the element is at the boundary for rendering, the element can be rendered according to the alternative rendering logic associated with the element.

20 Claims, 8 Drawing Sheets

SYSTEMS AND METHODS FOR PROVIDING REDUCED COMPLEXITY RENDERING OF USER INTERFACE ELEMENTS

FIELD OF THE INVENTION

The present technology relates to the field of social networks. More particularly, the present technology relates to techniques for rendering of user interfaces associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide user profiles for various users through which users may add connections, such as friends, or publish content items. A content item can be presented on a profile page of a user. A content item can also be presented through a feed, such as a newsfeed, for a user to view and access.

SUMMARY

Various embodiments of the present disclosure can include systems, methods, and non-transitory computer readable media configured to determine a depth of rendering a user interface (UI) element organized as a tree structure including one or more elements, wherein each element of the one or more elements is associated with a customary rendering logic and an alternative rendering logic. Whether an element in the tree structure is at a boundary for rendering the UI element can be determined based on the depth of rendering the UI element. In response to determining that the element is at the boundary for rendering, the element can be rendered according to the alternative rendering logic associated with the element.

In some embodiments, in response to determining that the element is not at the boundary for rendering, the element can be rendered according to the customary rendering logic associated with the element.

In certain embodiments, the alternative rendering logic associated with each element of the one or more elements renders a less amount of detail than the customary rendering logic associated with each element of the one or more elements.

In an embodiment, the UI element is a list item in a list view, and the one or more elements include one or more of: an image, a video, or a text.

In some embodiments, the UI element is rendered, and the rendering the UI element comprises traversing the tree structure based on the depth of rendering.

In certain embodiments, a depth parameter indicates the depth of rendering.

In an embodiment, a value of the depth parameter decreases by 1 when traversing a level in the tree structure.

In some embodiments, the element is determined to be at the boundary when the value of the depth parameter is 0.

In certain embodiments, the alternative rendering logic renders a block of a particular color for the element.

In an embodiment, the depth of rendering is determined based on one or more of: a scroll speed associated with a user interface or an availability of parallel processing.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
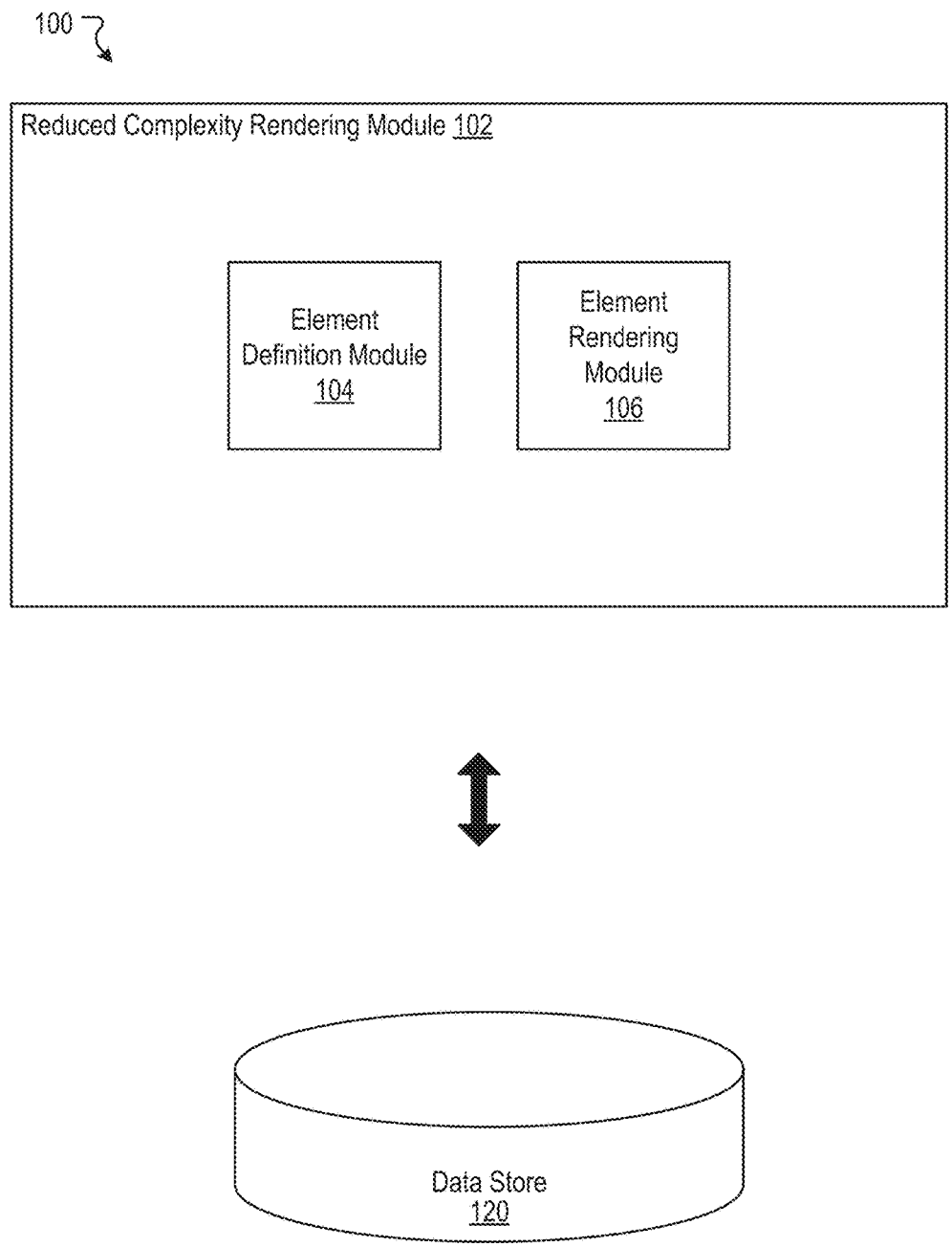
FIG. 1 illustrates an example system including an example reduced complexity rendering module configured to provide reduced complexity rendering of user interface elements, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Reduced Complexity Rendering of User Interface Elements

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add connections, such as friends, or publish content items. A content item can be presented on a profile page of a user. A content item can also be presented in a feed, such as a newsfeed, for a user to view and access through a user interface.

Rendering user interface (UI) elements in a user interface can require a significant amount of resources, such as central processing unit (CPU) processing power, graphics processing unit (GPU) processing power, etc. For example, rendering content items in a feed of a user can involve rendering of images and text layouts, which can consume a significant amount of CPU and/or GPU processing. Often, rendering of UI elements can create a bottleneck in processing data to be provided to a user. Conventional approaches specifically arising in the realm of computer technology can perform a full rendering of all UI elements included in a user interface. As described, a full rendering of all UI elements in a user interface can often disadvantageously consume undue amounts of processing power.

An improved approach rooted in computer technology can overcome the foregoing and other disadvantages associated with conventional approaches specifically arising in the realm of computer technology. Based on computer technology, the disclosed technology can provide rendering of UI elements with reduced complexity. The disclosed technology can limit a depth of rendering of a UI element and define an alternative rendering logic that can be executed when the depth of rendering is limited. The disclosed technology can indicate a boundary or breakpoint for rendering when the depth of rendering is limited. A UI element can be organized in a tree structure ("tree") and can have multiple levels. For example, a UI element can have one or more child elements, each of which can also have one or more child elements. Each child element can also be a UI element. An example of a UI element organized in a tree structure can include a list view, a list item, etc. A UI element can have a customary rendering logic associated with it, and the UI element can be rendered according to the customary rendering logic. The disclosed technology can specify an alternative rendering logic that should be executed when a UI element is associated with a boundary for rendering. The alternative rendering logic can specify a rendering that requires less computing resources than the customary rendering logic. The alternative rendering logic can have reduced complexity for rendering compared to the customary rendering logic. Using the alternative rendering logic can provide an indication to users that UI elements are being rendered, without fully rendering the UI elements. Under certain circumstances, a depth of rendering a UI element can be limited to a certain number of levels in the tree of the UI element. For example, a boundary for limiting the depth of rendering can be applied to a particular level in the tree. When the depth of rendering is reduced, a bottommost level of the tree within the reduced depth can be treated as a boundary for rendering. A UI element at a level that is treated as the boundary can execute the alternative rendering logic associated with the UI element. Rendering of the tree can stop at the boundary after rendering UI elements at the level of the boundary. The depth of rendering for UI elements can be determined as specified by applications. The depth of rendering for UI elements can be determined dynamically, for example, based on runtime conditions of a device. In this manner, the disclosed technology can provide a flexible way of limiting a depth of rendering for UI elements and reducing complexity of rendering UI elements. Details relating to the disclosed technology are explained further below.

FIG. 1 illustrates an example system 100 including an example reduced complexity rendering module 102 configured to provide reduced complexity rendering of user interface elements, according to an embodiment of the present disclosure. The reduced complexity rendering module 102 can include an element definition module 104 and an element rendering module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the reduced complexity rendering module 102 can be implemented in any suitable combinations.

The element definition module 104 can define UI elements and alternative rendering logic associated with the UI elements. A UI element can be organized as a tree and can include multiple levels. A UI element can have child elements, which in turn can have their own child elements. Each child element of a UI element can also be a UI element. For example, a UI element can be a list item of a list view, and the list item can have child elements, such as a text box, an image, a video, etc. Each UI element can have a customary rendering logic associated with it. For example, a list item has an associated customary rendering logic, a text box has an associated customary rendering logic, and so forth. If a UI element is not associated with a boundary for rendering, the UI element can be rendered according to its customary rendering logic. Each UI element can also have an alternative rendering logic associated with it. If a UI element is associated with a boundary for rendering, the alternative rendering logic can be executed. The alternative rendering logic can specify a rendering that requires less computing resources than the customary rendering logic. The alternative rendering logic can have reduced complexity compared to the customary rendering logic. For example, if the customary rendering logic for a text box renders a text layout for the text box and a content for the text box in full detail, the alternative rendering logic for the text box can render a block of a particular color in place of the text box. Similarly, if the customary rendering logic for an image renders image data, the alternative rendering logic can render a box of a particular color in place of the image or render image data at a lower resolution. In certain embodiments, the alternative rendering logic can be defined or implemented by creating wrapper elements for existing UI elements.

The element definition module 104 can define a UI element in any UI layout or rendering language, such as a UI markup language. For example, the customary rendering logic and the alternative rendering logic of a UI element can be defined using one or more UI rendering languages. Examples of UI rendering languages can include XML, HTML, JSON, etc. The alternative rendering logic can be defined using a branching logic. For example, a UI rendering language can specify that, if a UI element is associated with a boundary for rendering, the alternative rendering logic can be executed, and if otherwise, the customary rendering logic can be executed.

The alternative rendering logic can provide an indication to users of some level of rendering of UI elements. If no rendering is performed for a UI element, users may perceive such lack of rendering as a failure or delay in processing. However, if users see at least an outline of the layout of UI elements, such as blocks of color, users can recognize that the UI elements are being rendered at least to some extent. The alternative rendering logic can specify any type of rendering that can provide an indication of some level of rendering for UI elements without fully rendering the UI elements. In some embodiments, the alternative rendering logic can provide at least a partial appearance or indication of UI elements.

The element rendering module 106 can render UI elements. UI elements can be rendered according to their customary rendering logic or their alternative rendering logic based on a depth of rendering. A depth of rendering can be specified by a parameter. A value of the parameter can indicate a number of levels for rendering. The element rendering module 106 is described in more detail herein.

In some embodiments, the reduced complexity rendering module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the reduced complexity rendering module 102 can be, in part or in whole, implemented as software running on one or more computing devices or systems, such as on a server system or a client computing device. In some instances, the reduced complexity rendering module 102 can be, in part or in whole, implemented within or configured to operate in conjunction or be integrated with a social networking system (or service), such as a social networking system 630 of FIG. 6. Likewise, in some instances, the reduced complexity rendering module 102 can be, in part or in whole, implemented within or configured to operate in conjunction or be integrated with a client computing device, such as the user device 610 of FIG. 6. For example, the reduced complexity rendering module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the reduced complexity rendering module 102. The data maintained by the data store 120 can include, for example, information relating to UI elements, customary rendering logic associated with UI elements, alternative rendering logic associated with UI elements, limited depth for rendering UI elements, processing UI elements as boundaries for limited depth rendering, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the reduced complexity rendering module 102 can be configured to communicate and/or operate with the data store 120. In some embodiments, the data store 120 can be a data store within a client computing device. In some embodiments, the data store 120 can be a data store of a server system in communication with the client computing device.

Figure 2:
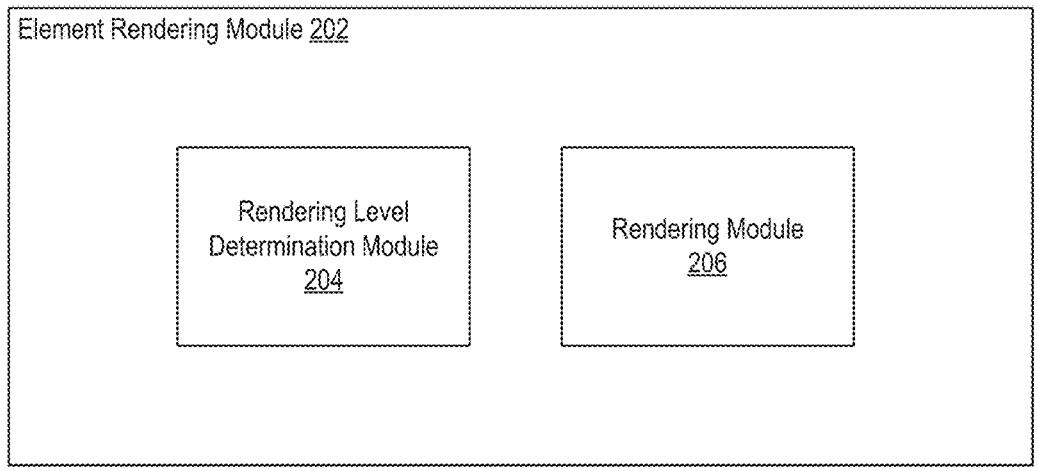
FIG. 2 illustrates an example element rendering module configured to render user interface elements with reduced complexity, according to an embodiment of the present disclosure.

FIG. 2 illustrates an example element rendering module 202 configured to render user interface elements with reduced complexity, according to an embodiment of the present disclosure. In some embodiments, the element rendering module 106 of FIG. 1 can be implemented with the example element rendering module 202. As shown in the example of FIG. 2, the example element rendering module 202 can include a rendering level determination module 204 and a rendering module 206.

The rendering level determination module 204 can determine a depth of rendering for a UI element. The depth of rendering can be specified as a number of levels in a tree of a UI element that should be rendered. A default depth of rendering can be a total number of levels in a tree of a UI element. An application can specify how to determine the depth of rendering for UI elements. For example, the depth of rendering can be based on a scroll speed of a user. When a user is scrolling through a user interface, UI elements may not need to be rendered fully. Accordingly, the depth of rendering can be determined to have an inverse relationship to the scroll speed. In another example, the depth of rendering can be based on whether parallel processing is available. An application can require simultaneously rendering data for a current display for a user interface and downloading data for a next display for the user interface. If parallel processing is not available, the application can indicate that downloading data for the next display has priority over rendering data for the current display. Accordingly, the application can specify that the depth of rendering should be lower when parallel processing is unavailable in order to reduce the amount of rendering for the current display. In some embodiments, the depth of rendering can be determined based on whether UI operations require full rendering or not (e.g., scroll speed). In certain embodiments, the depth of rendering can be determined based on device resources or characteristics, such as CPU processing power, CPU processing time, GPU processing power, the GPU processing time, memory, etc. All examples herein are provided for illustrative purposes, and there can be many variations and other possibilities.

A depth parameter can indicate the depth of rendering. A value of the depth parameter can be determined as specified by an application. The value of the depth parameter can be determined dynamically based on runtime conditions. The depth parameter can have a default value associated with it, and the default value can be used when a value is not determined for the depth parameter. For example, the default value can be a total number of levels in the tree of a UI element. The value of the depth parameter can be passed to a UI element, and the UI element can be rendered by the rendering module 206 based on the value of the depth parameter as explained below.

The rendering module 206 can render a UI element based on the determined depth of rendering. The rendering level determination module 204 can pass the value of the depth parameter to the UI element after determining the depth of rendering. The tree of the UI element can be rendered according to the determined depth of rendering. The tree of the UI element can be rendered from top to bottom within the depth of rendering. If the depth of rendering is the same as the number of levels in the tree of the UI element, the UI element can be fully rendered according the customary rendering logic. However, if the depth of rendering is less than the number of levels in the tree of the UI element, the UI element can be rendered with reduced complexity. For example, a tree of a UI element can have 3 levels of depth. If the depth of rendering is 3 levels, the tree can be rendered with full complexity. If the depth of rendering is less than 3 levels, the tree can be rendered with reduced complexity. With reduced complexity, the tree can be rendered with 2 levels, 1 level, or 0 levels. A level in the tree that is bottommost within the reduced depth of rendering can be treated as a boundary for rendering. When a UI element is at a boundary for rendering, the UI element is rendered according to the alternative rendering logic. Rendering of the tree can stop after rendering UI elements at the boundary.

The boundary for rendering can be determined based on the value of the depth parameter. The value of the depth parameter can be cascaded or passed down from one level in the tree to another level in the tree (e.g., from an upper level to a lower level). The value of the depth parameter can be decreased by 1 each time a level in the tree is traversed. The value of the depth parameter for a level in the tree can be passed to each UI element at that level. When the value of the depth parameter that is passed to a UI element is 0, the UI element can recognize that it is at the boundary and execute the alternative rendering logic associated with it. The value of 0 can indicate that a current level in the tree is a bottommost level within the reduced depth of rendering and is therefore at a boundary for rendering. For example, a branching logic for a UI element can specify that if the value of the depth parameter is 0, the UI element should be rendered according to the alternative rendering logic, and if not, the UI element should be rendered according to the customary rendering logic.

As explained above, the tree of a UI element can be rendered from top to bottom. Rendering of the UI element can start with a topmost element in the tree (e.g., the UI element itself). The tree can be traversed according to the depth of rendering. For each level in the tree, control can be passed from a parent element to a child element along with the value of the depth parameter for that level. A UI element at a level can run the customary rendering logic or the alternative rendering logic based on the value of the depth parameter passed to it. In some cases, a customary rendering logic of a UI element may not specify a particular rendering and instead pass control to a child element. For example, if a photo element includes an image child element, the customary rendering logic of the photo element may not specify rendering of the photo element, but instead may rely on the customary rendering logic of the image element to render the image data.

Various UI elements can be displayed in a user interface at the same time, and the depth of rendering for the various UI elements can be controlled independently or together. There can be separate depth parameters for the various UI elements or there can be one depth parameter that controls some or all of the various UI elements. For example, if there are multiple list items in a list view, the depth of rendering for each list item can be determined individually, or the depth of rendering can be determined for all list items in the list view.

A UI element that is organized as a tree structure can be a child element of another UI element. For example, a list item can be a child element of a list view. Similar to rendering the tree of a UI element, control can be passed from a parent element to a child element. The depth of rendering can be determined for the list view, and a depth parameter can be passed from the list view to list items. The value of the depth parameter can decrease by 1 when passed from the list view to the list items. In this way, the depth of rendering can be determined hierarchically and passed from a UI element to child UI elements of the UI element.

Figure 3A:
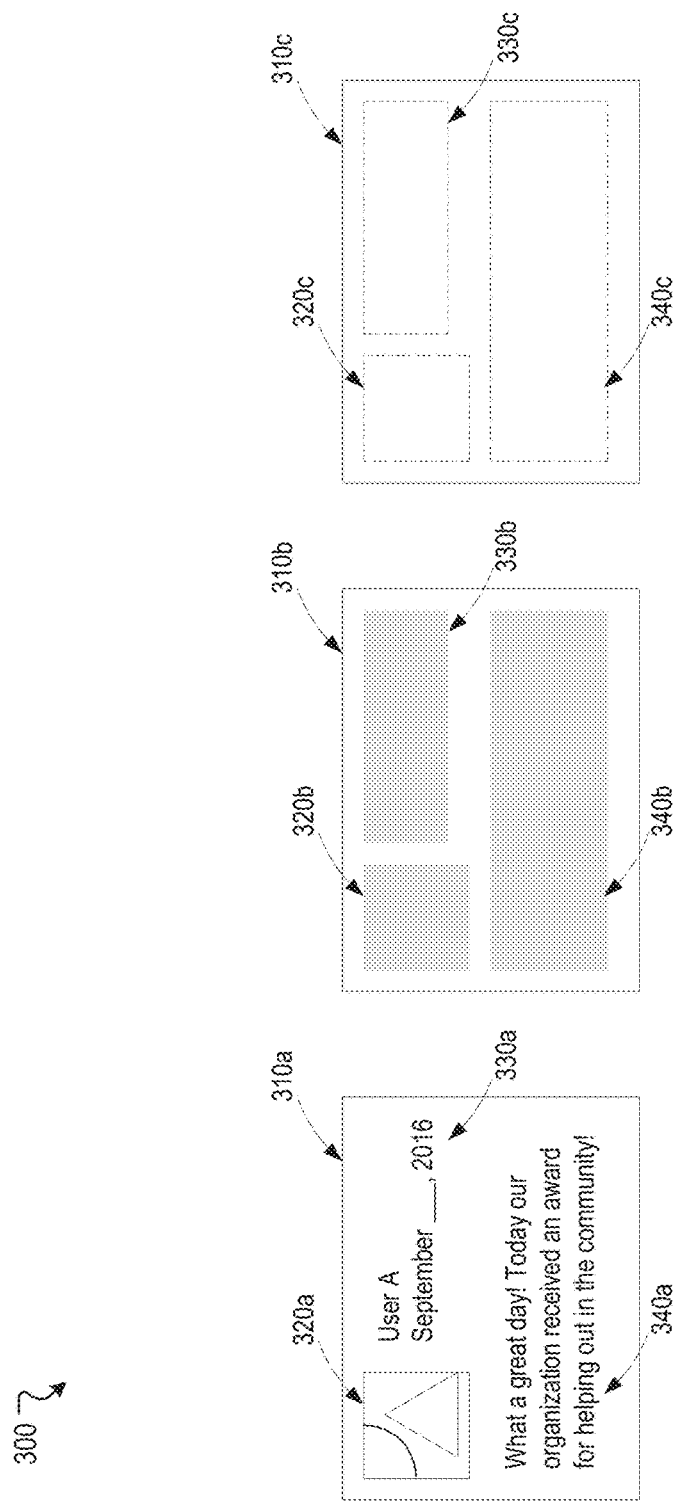
FIG. 3A illustrates an example scenario for providing reduced complexity rendering of user interface elements, according to an embodiment of the present disclosure.

FIG. 3A illustrates an example scenario 300 for providing reduced complexity rendering of user interface elements, according to an embodiment of the present disclosure. A feed of a user can be represented as a list view, and content items included in the feed of the user can each be represented as a list item. The example scenario 300 shows versions of the same content item 310 rendered at different levels of rendering complexity. For example, the content item 310 is rendered with decreasing complexity from left to right. The content item 310 can include an image 320, a title 330, and a body 340. The title 330 can include a name of the user and a date. The content item 310a is rendered with full complexity. For the content item 310a, image data is rendered for the image 320a, a text for the title 330a is rendered, and a text for the body 340a is rendered. The content item 310b is rendered at a complexity between full complexity and lowest complexity. For the content item 310b, a respective block of color is rendered for the image 320b, the title 330b, and the body 340b. The content item 310c is rendered with the lowest complexity. For the content item 310c, a block of color is rendered for the content item 310c itself. The image 320c, the title 330c, and the body 340c are not rendered. In the example of FIG. 3A, the image 320c, the title 330c, and the body 340c are indicated in dashed lines to illustrate positions where they would be shown if rendered.

Figure 3B:
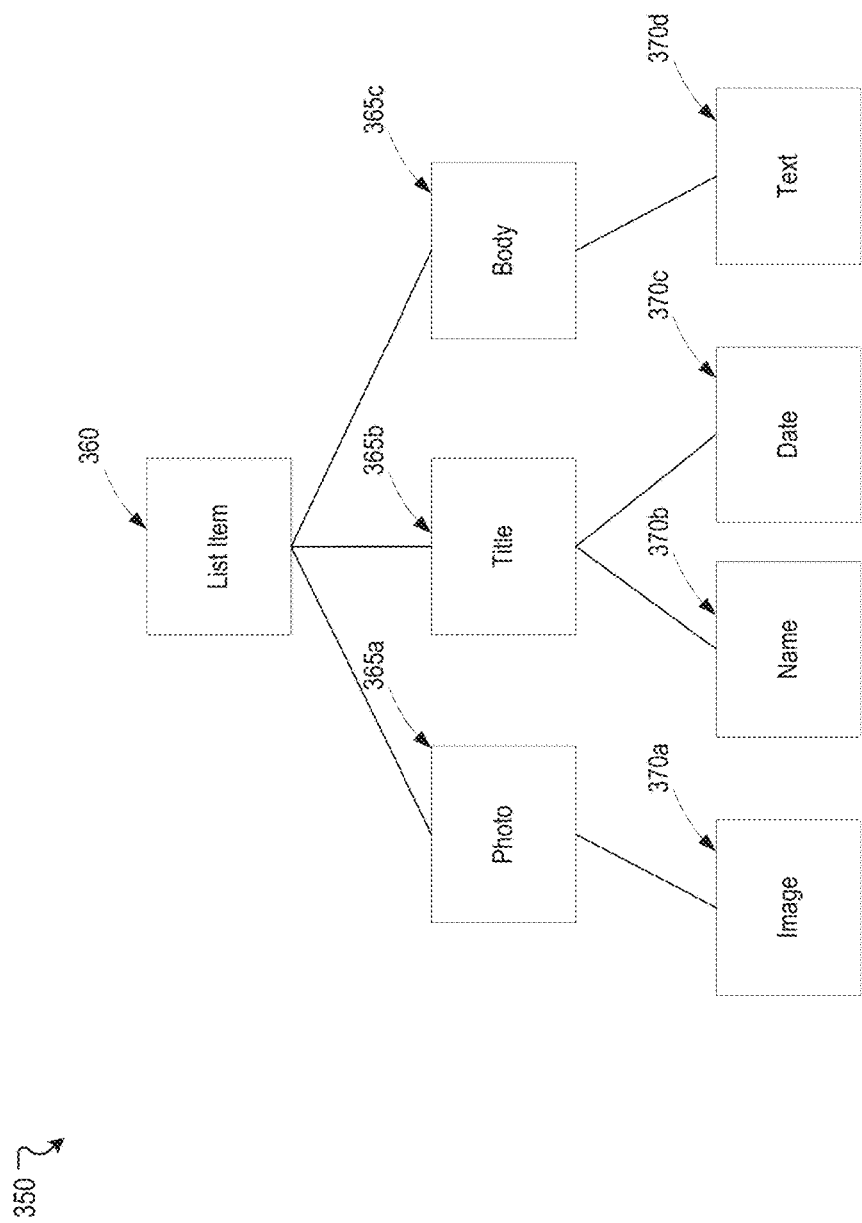
FIG. 3B illustrates an example scenario for rendering user interface elements at multiple levels, according to an embodiment of the present disclosure.

FIG. 3B illustrates an example scenario 350 for rendering user interface elements at multiple levels, according to an embodiment of the present disclosure. The example scenario 350 illustrates a list item 360 organized as a tree. The tree for the list item 360 includes 3 levels. The topmost element of the tree is the list item 360 itself. The list item 360 has 3 child elements: a photo 365a, a title 365b, and a body 365c. The photo 365 has 1 child element: an image 370a. The title 365b has 2 child elements: a name 370b and a date 370c. The body 365c has 1 child element: a text 370d. A value of a depth parameter indicating a depth of rendering is passed to the list item 360. If a value of a depth parameter passed to the list item 360 is 3, the list item 360 is fully rendered, and all elements in the tree are rendered according to respective customary rendering logic. If the value of the depth parameter passed to the list item 360 is 2 or less, the list item 360 is rendered with reduced complexity, and elements at a boundary for rendering are rendered according to respective alternative rendering logic. Each time the value of the depth parameter is passed down as the tree is traversed, the value of the depth parameter decreases by 1. If the value of the depth parameter passed to an element is 0, the element is rendered according to the alternative rendering logic.

The example scenario 350 is described in connection with examples of different values of the depth parameter. If the value of the depth parameter passed to the list item 360 is 2, the list item 360 is rendered according to its customary rendering logic. The value of the depth parameter passed to the photo 365a, the title 365b, and the body 365c is 1, and these elements are rendered according to their respective customary rendering logic. The value of the depth parameter passed to the image 370a, the name 370b, the date 370c, and the text 370d is 0, and these elements are rendered according to their respective alternative rendering logic. If the value of the depth parameter passed to the list item 360 is 1, the list item 360 is rendered according to its customary rendering logic. The value of the depth parameter passed to the photo 365a, the title 365b, and the body 365c is 0, and these elements are rendered according to their respective alternative rendering logic. For example, the respective alternative rendering logic for the photo 365a, the title 365b, and the body 365c can render each element as a block of color. In this case, the image 370a, the name 370b, the date 370c, and the text 370d are not rendered. If the value of the depth parameter passed to the list item 360 is 0, the list item 360 is rendered according to its alternative rendering logic. In one example, the alternative rendering logic for an element can render the list item 360 as a block of a particular color or shade. In this case, the photo 365a, the title 365b, and the body 365c are not rendered. The image 370a, the name 370b, the date 370c, and the text 370d are also not rendered. Many variations are possible.

In some embodiments, a certain number of content items may need to be rendered for a unit of time (e.g., a minute, a second, etc.). The depth of rendering can be determined based on an inverse relationship to the number of content items to render for a unit of time. If more content items need to be rendered for a unit of time, the depth of rendering can be lower, and if fewer content items need to be rendered for a unit of time, the depth of rendering can be higher. The number of content items to render can be related to a scroll speed associated with a user interface. For example, if the scroll speed is high, more content items can be rendered for a unit of time, and if the scroll speed is low, fewer content items can be rendered for a unit of time. Therefore, the depth of rendering can also have an inverse relationship to the scroll speed.

Figure 4:
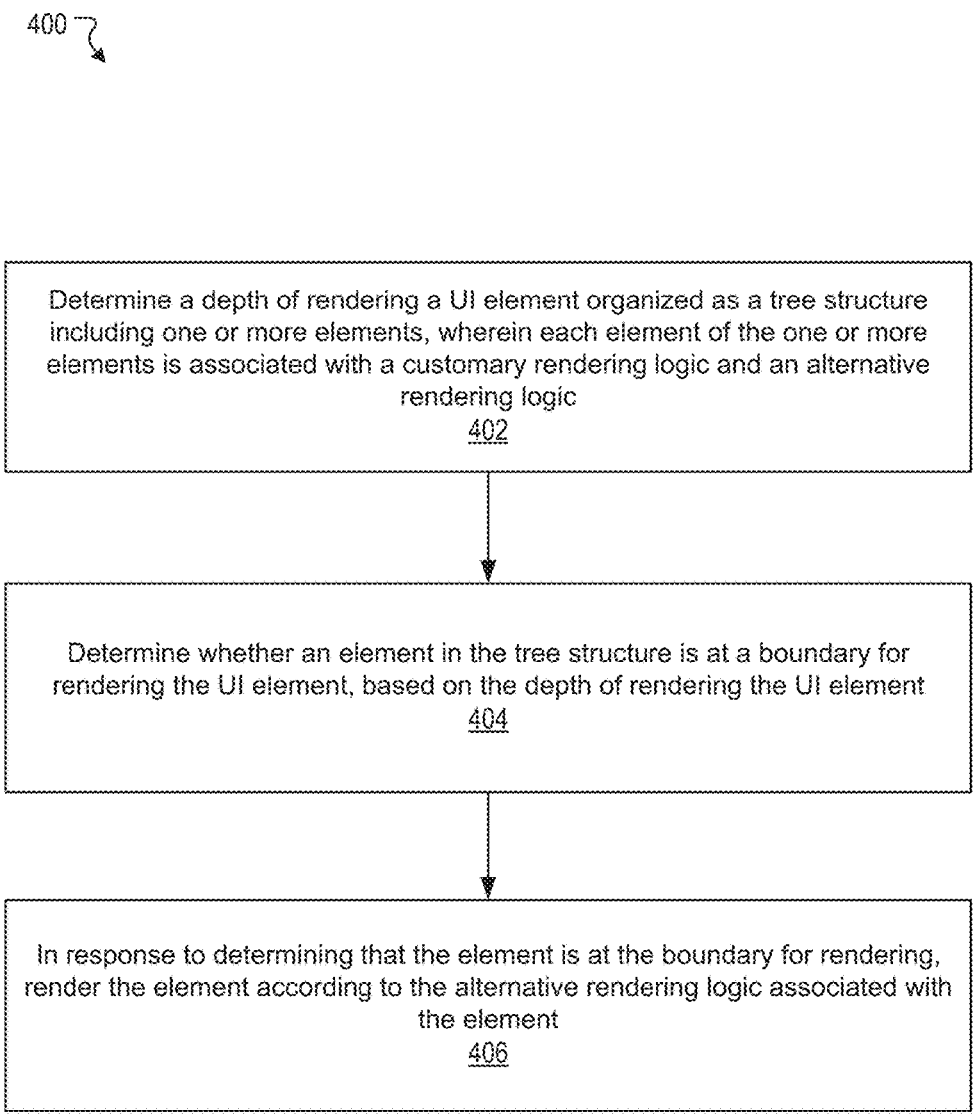
FIG. 4 illustrates an example first method for providing reduced complexity rendering of user interface elements, according to an embodiment of the present disclosure.

FIG. 4 illustrates an example first method 400 for providing reduced complexity rendering of user interface elements, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can determine a depth of rendering a UI element organized as a tree structure including one or more elements, wherein each element of the one or more elements is associated with a customary rendering logic and an alternative rendering logic. At block 404, the example method 400 can determine whether an element in the tree structure is at a boundary for rendering the UI element, based on the depth of rendering the UI element. At block 406, the example method 400 can, in response to determining that the element is at the boundary for rendering, render the element according to the alternative rendering logic associated with the element. Other suitable techniques that incorporate various features and embodiments of the present disclosure are possible.

Figure 5:
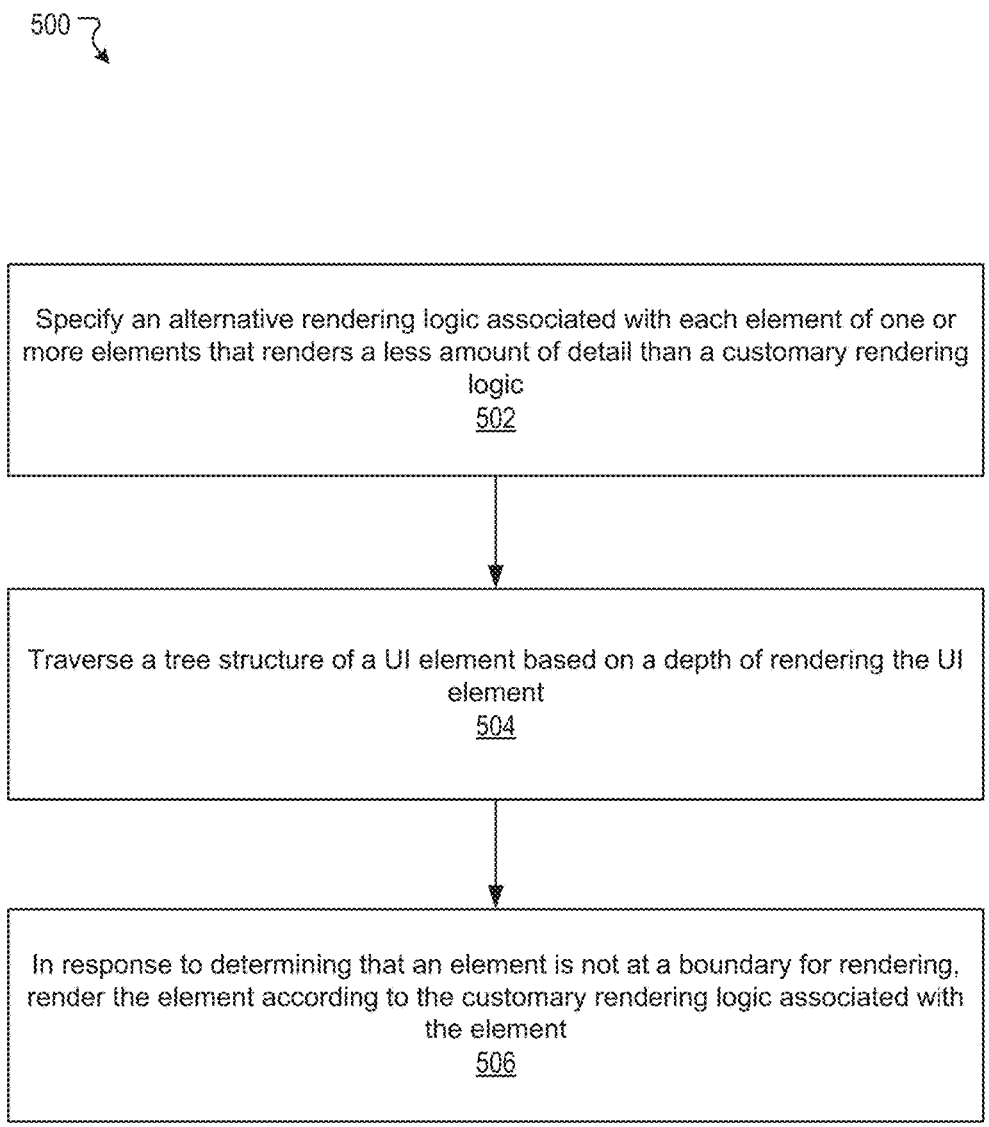
FIG. 5 illustrates an example second method for providing reduced complexity rendering of user interface elements, according to an embodiment of the present disclosure.

FIG. 5 illustrates an example second method 500 for providing reduced complexity rendering of user interface elements, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can specify an alternative rendering logic associated with each element of one or more elements that renders a less amount of detail than a customary rendering logic. The alternative rendering logic and the customary rendering logic can be similar to the alternative rendering logic and the customary rendering logic explained in connection with FIG. 4. At block 504, the example method 500 can traverse a tree structure of a UI element based on a depth of rendering the UI element. The tree structure and the UI element can be similar to the tree structure and the UI element explained in connection with FIG. 4. At block 506, the example method 500 can, in response to determining that an element is not at a boundary for rendering, render the element according to the customary rendering logic associated with the element. The element and the boundary for rendering can be similar to the element and the boundary for rendering explained in connection with FIG. 4. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
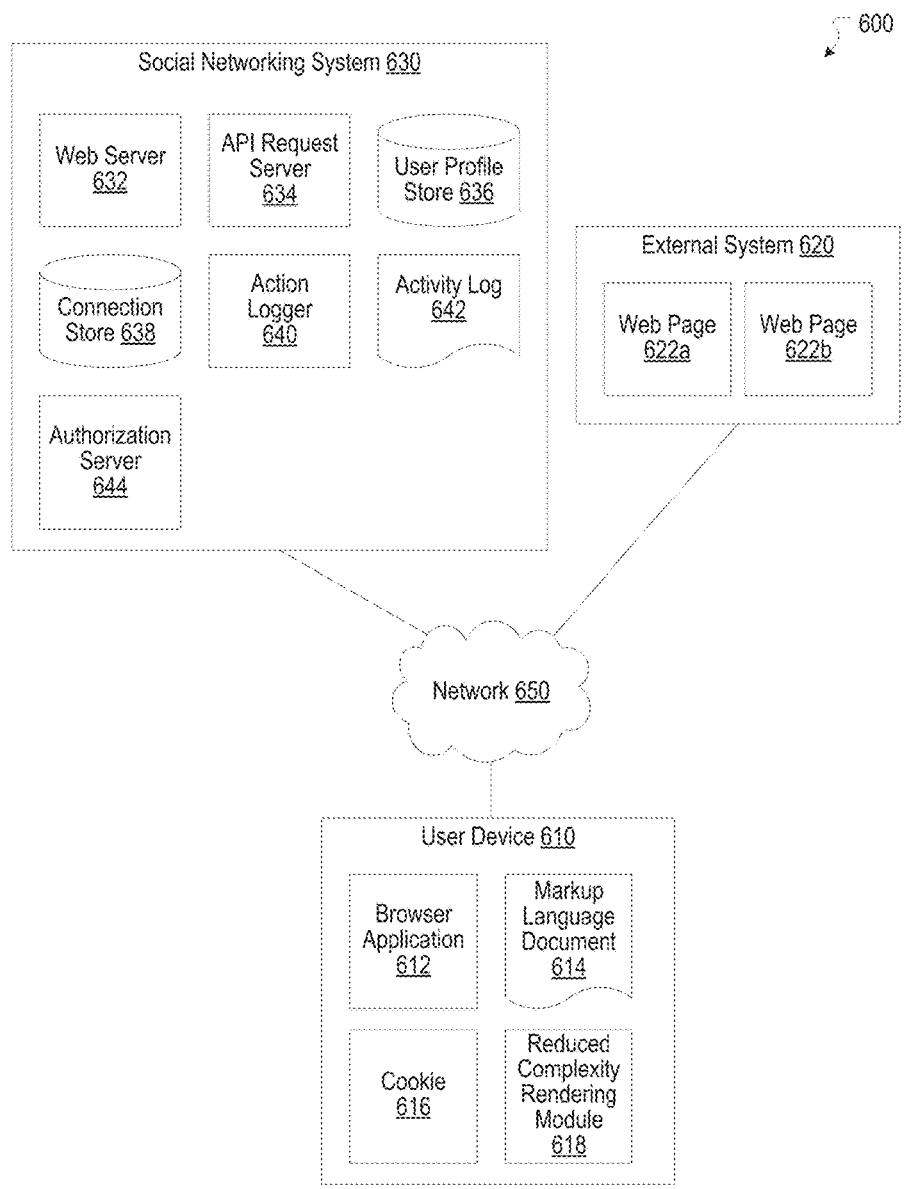
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a reduced complexity rendering module 618. The reduced complexity rendering module 618 can be implemented with the reduced complexity rendering module 102, as discussed in more detail herein. In some embodiments, one or more functionalities of the reduced complexity rendering module 618 can be implemented in the social networking system 630.

Hardware Implementation

Figure 7:
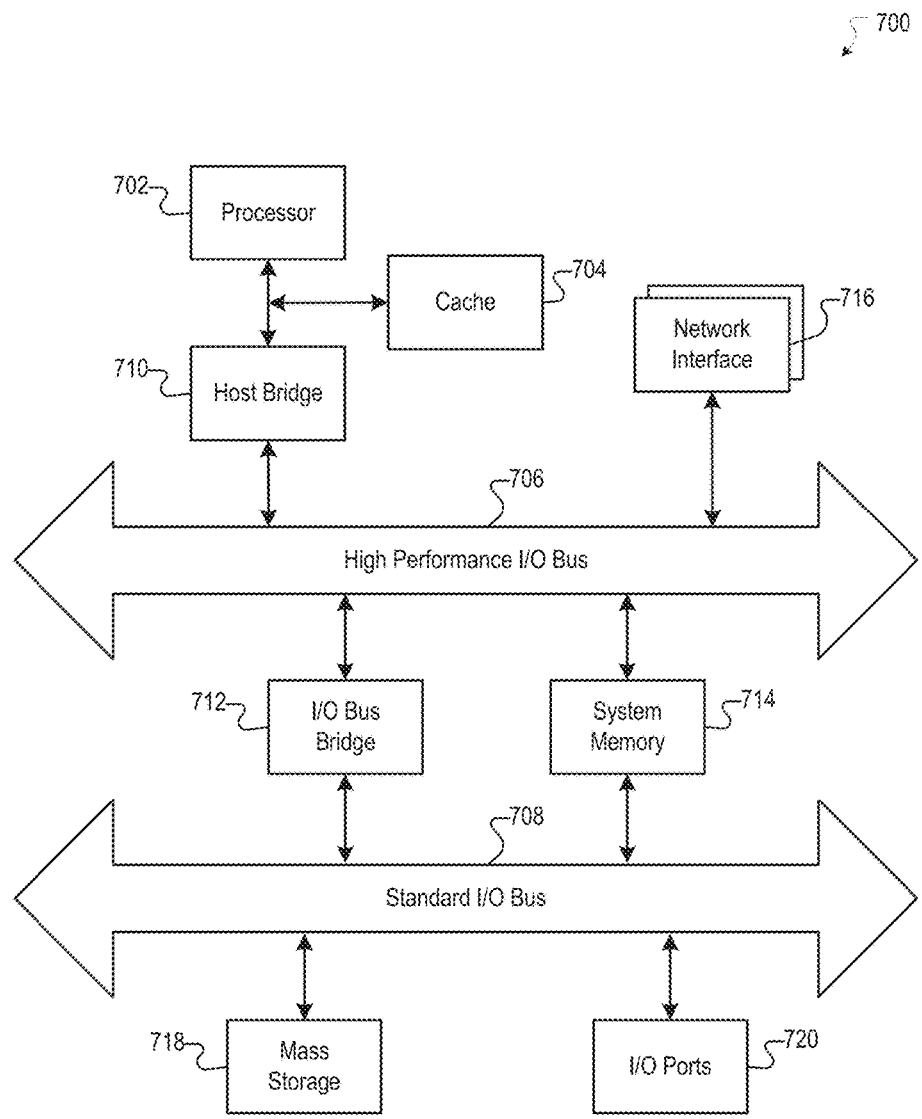
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a depth of rendering a user interface (UI) element organized as a tree structure including one or more elements, wherein each element of the one or more elements is associated with a customary rendering logic and an alternative rendering logic;
   determining, by the computing system, whether an element in the tree structure is at a boundary for rendering the UI element, based on the depth of rendering the UI element, wherein the depth of rendering is determined based on one or more of: a scroll speed associated with a UI or an availability of parallel processing; and
   in response to determining that the element is at the boundary for rendering, by the computing system, rendering the element according to the alternative rendering logic associated with the element.

2. The computer-implemented method of claim 1, further comprising, in response to determining that the element is not at the boundary for rendering, rendering the element according to the customary rendering logic associated with the element.

3. The computer-implemented method of claim 1, wherein the alternative rendering logic associated with each element of the one or more elements renders a less amount of detail than the customary rendering logic associated with each element of the one or more elements.

4. The computer-implemented method of claim 1, wherein the UI element is a list item in a list view, and wherein the one or more elements include one or more of: an image, a video, or a text.

5. The computer-implemented method of claim 1, further comprising rendering the UI element, wherein the rendering the UI element comprises traversing the tree structure based on the depth of rendering.

6. The computer-implemented method of claim 5, wherein a depth parameter indicates the depth of rendering.

7. The computer-implemented method of claim 6, wherein a value of the depth parameter decreases by 1 when traversing a level in the tree structure.

8. The computer-implemented method of claim 7, wherein the element is determined to be at the boundary when the value of the depth parameter is 0.

9. The computer-implemented method of claim 1, wherein the alternative rendering logic renders a block of a particular color for the element.

10. The computer-implemented method of claim 1, wherein the depth of rendering is further determined based on one or more of: a UI operation, a device resource, or a device characteristic.

11. A system comprising:
    at least one hardware processor; and
    a memory storing instructions that, when executed by the at least one processor, cause the system to perform:
    determining a depth of rendering a user interface (UI) element organized as a tree structure including one or more elements, wherein each element of the one or more elements is associated with a customary rendering logic and an alternative rendering logic;

determining whether an element in the tree structure is at a boundary for rendering the UI element, based on the depth of rendering the UI element, wherein the depth of rendering is determined based on one or more of: a scroll speed associated with a UI or an availability of parallel processing; and in response to determining that the element is at the boundary for rendering, rendering the element according to the alternative rendering logic associated with the element.

12. The system of claim 11, wherein the instructions further cause the system to perform, in response to determining that the element is not at the boundary for rendering, rendering the element according to the customary rendering logic associated with the element.

13. The system of claim 11, wherein the alternative rendering logic associated with each element of the one or more elements renders a less amount of detail than the customary rendering logic associated with each element of the one or more elements.

14. The system of claim 11, wherein the instructions further cause the system to perform rendering the UI element, and wherein the rendering the UI element comprises traversing the tree structure based on the depth of rendering.

15. The system of claim 11, wherein the depth of rendering is further determined based on one or more of: a UI operation, a device resource, or a device characteristic.

16. A non-transitory computer readable medium including instructions that, when executed by at least one hardware processor of a computing system, cause the computing system to perform a method comprising:

determining a depth of rendering a user interface (UI) element organized as a tree structure including one or more elements, wherein each element of the one or more elements is associated with a customary rendering logic and an alternative rendering logic;

determining whether an element in the tree structure is at a boundary for rendering the UI element, based on the depth of rendering the UI element, wherein the depth of rendering is determined based on one or more of: a scroll speed associated with a UI or an availability of parallel processing; and in response to determining that the element is at the boundary for rendering, rendering the element according to the alternative rendering logic associated with the element.

17. The non-transitory computer readable medium of claim 16, wherein the method further comprises, in response to determining that the element is not at the boundary for rendering, rendering the element according to the customary rendering logic associated with the element.

18. The non-transitory computer readable medium of claim 16, wherein the alternative rendering logic associated with each element of the one or more elements renders a less amount of detail than the customary rendering logic associated with each element of the one or more elements.

19. The non-transitory computer readable medium of claim 16, wherein the method further comprises rendering the UI element, and wherein the rendering the UI element comprises traversing the tree structure based on the depth of rendering.

20. The non-transitory computer readable medium of claim 16, wherein the depth of rendering is further determined based on one or more of: a UI operation, a device resource, or a device characteristic.

* * * * *